United States Patent [19]
Kertscher et al.

[11] Patent Number: 5,772,041
[45] Date of Patent: Jun. 30, 1998

[54] METHOD FOR RECOVERING MATERIALS

[75] Inventors: Eberhard Kertscher, Yvonand; Bruno Buluschek, Echandens, both of Switzerland

[73] Assignee: E. Kertscher S.A., Yvonand, Switzerland

[21] Appl. No.: 578,544

[22] PCT Filed: Jun. 16, 1994

[86] PCT No.: PCT/EP94/01961

§ 371 Date: Jan. 23, 1996

§ 102(e) Date: Jan. 23, 1996

[87] PCT Pub. No.: WO95/03127

PCT Pub. Date: Feb. 2, 1995

[30] Foreign Application Priority Data

Jul. 26, 1993 [FR] France .................................. 93/09264

[51] Int. Cl.$^6$ ...................................................... B03B 1/02
[52] U.S. Cl. .................................................. 209/11; 209/1
[58] Field of Search .................................. 209/2, 3, 11, 1

[56] References Cited

U.S. PATENT DOCUMENTS 3,670,969  6/1972  Terada ........................................ 209/11
3,744,779  7/1973  Perry ......................................... 209/11
4,091,825  5/1978  Baker ......................................... 209/11
4,750,993  6/1988  Donhauser et al. ........................ 209/11
5,350,562  9/1994  Anthony ..................................... 209/11

FOREIGN PATENT DOCUMENTS 3129638  3/1983  Germany .
4112179  5/1992  Germany .
 549887  5/1974  Switzerland .

Primary Examiner—Karen M. Young
Assistant Examiner—Gregory A. Morse
Attorney, Agent, or Firm—Griffin, Butler Whisenhunt & Szipl

[57] ABSTRACT

A method for recovering materials, in particular rejects or scraps of sheathed cables or wires, comprises introducing the parts into an enclosed space and placing them on a support provided with a drain, removing the oxygen from the enclosed space, raising the temperature inside the enclosed spaced until it reaches a melting temperature of one of the materials so that it drains through the drain, collecting the melted material in a recovery tank maintained at a temperature less than or equal to the melting temperature, then raising the temperature inside the enclosed space to cause the material remaining on the parts to dissipate in the form of vapour or gas, and recovering after cooling, the material drained into the recovery tank and the material or materials remaining on the support.

12 Claims, 1 Drawing Sheet

METHOD FOR RECOVERING MATERIALS

FIELD OF INVENTION

The present invention concerns a method for recovering materials, and, in particular, a method for recovering pairs of materials of the plastic/metal type from waste.

More particularly, this invention concerns a method enabling the recovery, from rejects or scraps of new or used sheathed cable and/or insulated wire, of both the plastic sheathing or insulating material, which covers the core of the cable or wire, and the metal material actually forming the core.

BACKGROUND OF THE INVENTION

One of the known methods for recovering these sheathed cable and insulated wire reject or scrap materials consists of removing with the use of a flame, that is to say, essentially by combustion, the plastic material forming the sheathing, then recovering the almost stripped core.

The major disadvantage of this method is that the plastic material, having been burnt, has decomposed, so that it is impossible subsequently to recover and recycle it. Furthermore, this method involves the emission of polluting gases which have to be processed, in order to comply with environmental protection legislation, by heavy and costly industrial installations before being released into the atmosphere, which makes this process uneconomic.

A second known method consists of mechanically stripping the cables or wires with the aid of mechanical operations implemented by an appropriate machine. This method unfortunately is not entirely satisfactory since it has been noted that there remains on the stripped cables or wires residue of the sheathing material and that metallic particles forming the core of the cable are found in the plastic material. The stripped scraps and plastic material thus obtained have a lower commercial value and their ability to be recycled is markedly reduced.

SUMMARY OF THE INVENTION

A main object of the invention is thus to overcome the disadvantages of the aforementioned prior art by providing a method for recovering materials which enables the materials processed to be recovered in their entirety and in their purest possible form, that is to say without any reciprocal pollution.

The invention thus concerns a method for recovering materials from parts to be processed, such as rejects or scraps of new or used sheathed cables and/or insulated wires, characterised in that it comprises :

(a) introducing said parts into an airtight enclosed space and placing them on a support provided with draining means, (b) removing the oxygen contained in the enclosed space to create a neutral, non-oxidising atmosphere in the latter, (c) raising the temperature inside the enclosed space until it reaches a melting temperature of one of the materials forming said parts, and until said material drains through the draining means, (d) collecting said melted material in a recovery tank maintained at a temperature less or equal to said melting temperature, (e) further raising the temperature inside the enclosed space to cause said material, remaining on the parts to dissipate in the form of vapour or gas, and (f) recovering after cooling, on the one hand, the material drained into said tank, and on the other hand, the material or materials remaining on the support.

It is understood that thanks to this method, only a slight decomposition of the material takes place, in particular of the plastic material which is melted and collected in the recovery tank, said material being able to be wholly recycled by subsequently being cut into granules and mixed in a chosen proportion with a "new" material to produce new parts, for example new sheathed cables or new insulated wires.

It is further understood that it is possible, thanks to this method, to process significant volumes of materials while considerably limiting the polluting effects. Furthermore, this method can be easily implemented by an operator, thanks to appropriate programming of the heating periods and levels of the enclosed space as a function of the plastic/metal pairs of materials to be processed.

Other features and advantages of the invention will appear more clearly upon reading the following description of an embodiment of the invention given by way of example.

BRIEF DESCRIPTION THE DRAWING

FIG. 1 is a schematic representation of an installation enabling the material recovery method according to the invention to be implemented.

DESCRIPTION OF PREFERRED EMBODIMENT

Figure 1:
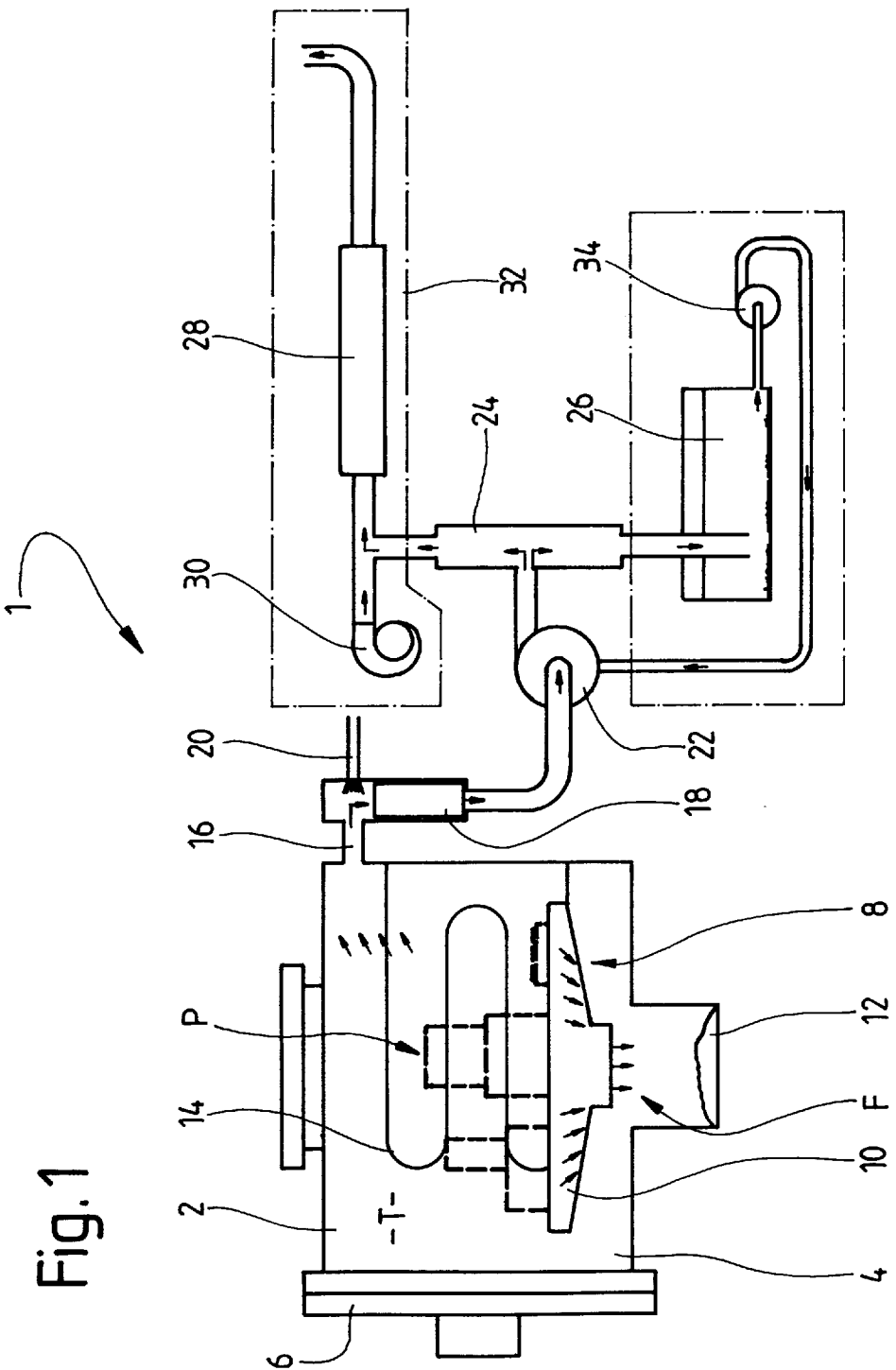

Referring to the attached drawing, an installation enabling the recovery method according to the invention to be implemented will now be described, this installation being designated by the general reference 1.

Installation 1 comprises an airtight enclosed space 2 inside which is arranged a processing chamber 4 which is sealed by a closing/opening door referenced 6. The arrangement of door 6 and enclosed space 2 will not be described in more detail here, since it is a conventional structure.

It is specified however that this arrangement is designed in a sufficiently hermetic manner that the level of air tightness of chamber 4 enables a suited vacuum inside the latter to be achieved, and more generally for the presence and introduction of oxygen inside enclosed space 2 to be avoided.

In chamber 4 of enclosed space 2 a support 8 is arranged upon which the parts to be processed can be placed, advantageously rejects or scraps of new or used sheathed cables and/or insulated wires, formed of at least two materials, plastic/metal.

These parts to be processed, which in this example comprise at least one core in a metallic material, such as copper, and at least one insulating sheath in a plastic material covering it, are designated here by the general reference P.

Support 8 is used with draining means and to this end, is formed, for example, of a perforated structure; this support being also used with a collector 10 formed of an assembly of drains arranged directly under support 8.

As will become clear below, collector 10 enables the material to be recycled, melted to a liquid or semi-viscous state, for example the plastic sheathing, to be received, in order to be transported to a recovery tank 12.

Recovery tank 12 is intended to receive directly by drainage the melted material which is referenced F and which is represented in a very schematic manner by a series of arrows.

This recovery tank 12 is further designed so that it is accessible to the user when the method has come to an end, and it includes, for this purpose, a communication lock chamber, not shown, as well as conventional manipulation members, such as handles.

Enclosed space 2 further comprises heating means 14 which are formed for raising the temperature, referenced T, inside chamber 4 of enclosed space 2, in a first period of time to a temperature such that one of the materials chosen from the parts to be treated, in particular the plastic insulating material, melts and gradually and continuously becomes detached from said parts, in a liquid, viscous or semi-viscous state.

It is to be noted that these heating means are further provided to raise temperature T in a second period of time to a higher temperature, that is to say to a temperature such that the plastic material remaining on the parts dissipates in the form of vapour or gas.

Heating means 14 may be formed by means for emitting infra-red rays, capable of heating both chamber 4 of enclosed space 2 and parts to be processed P, by thermal radiation.

Heating means 14 may also be formed by a network of resistors connected to the wall of enclosed space 2 (not shown) in order to raise the temperature inside chamber 4 to the desired temperatures and for the desired periods of time.

It is to be noted here that the increase in temperature inside chamber 4 of enclosed space 2 experienced by parts to be treated P is achieved without the use of a flame and without using direct heat on said parts, As will be understood below, this heating is advantageously carried out in a neutral non-oxidising atmosphere.

In this way, at least one of the materials of the parts to be processed is melted without any combustion, such material being in the example described a thermoplastic polymer and more generally an organic synthetic material, such as those conventionally used for sheathing/coating electric cables and wires.

By way of example, temperature T inside chamber 4 of enclosed space 2 may be raised to a value of 500° C. and may be appropriately selected as a function of the types of material to be recycled and the pairs of materials, plastic/metal, forming the parts to be processed.

At the outlet of enclosed space 2 is placed an exhaust tube 16, which is in direct communication with airtight chamber 4. Exhaust tube 16 receives emanations in the form of vapours and/or gas coming from the first melted material and from the dissipated remains, which are produced during the aforementioned rise in temperature Downstream of exhaust tube 16 is placed a first filter 18 in which a second part of the waste from the melted material or materials to be recovered is collected.

At this stage, the gaseous emanations emitted by the polymer or polymers forming the sheathing of processed parts P are collected.

Between exhaust tube 16 and filter 18 is arranged a conduit 20 via which a cooling liquid enabling the precipitation of the gaseous emanations, is projected towards filter 18, this liquid being advantageously water.

Thus, the gaseous emanations coming from the material or materials to be recycled which are first melted then from the subsequently dissipated residue of the latter, are precipitated and are conveyed towards a vacuum pump 22 formed for example by a ring water pump of conventional structure.

This ring water pump which forms one embodiment of suction means of installation 1 opens into a by-pass 24 which conveys the precipitation fluid to a sedimentation tank 26, while the residual gaseous emanations transported by the cooling liquid assuring the precipitation are conveyed to a catalyst 28 at the inlet of which is arranged a hot air fan 30.

One thus has, at the outlet of vacuum pump 22, gas processing means 32 designed to comply with environmental protection conditions.

It will be noted that sedimentation tank 26 communicates with a recirculating pump 34 which recirculates the cooling fluid brought into sedimentation tank 26 to propel it towards vacuum pump 22 and thus to form water recirculating means at the outlet of vacuum pump 22.

The method for recovering material according to the invention, which is implemented by installation 1 described above, is as follows.

First of all, after having opened door 6 of enclosed space 2, the parts to be processed are introduced inside processing chamber 4 and arranged on support 8.

Next, in a second step, after having hermetically sealed enclosed space 2, the oxygen which is contained in enclosed space 2 is removed by suction of the air contained in chamber 4 until, thanks to vacuum pump 22, a sufficient level of vacuum is obtained in said chamber.

In an alternative embodiment of this method, a neutral gas, such as nitrogen, is introduced into processing chamber 4. It is to be understood that a neutral, non-oxidising atmosphere is thereby created in enclosed space 2 and more particularly in processing chamber 4.

Next, while still maintaining this non-oxidising atmosphere in processing chamber 4 by continuous suction provided by pump 22, in a first period of time temperature T inside this chamber is raised until said temperature reaches and stays at a temperature Tf, called the melting temperature, at which one of the materials forming the parts to be processed turns into a liquid, viscous or semi-viscous state and drains away from said parts, and more particularly until the melting temperature of the plastic material or materials forming the parts is reached. This temperature Tf is between 200° C. and 300° C. for thermoplastic materials.

This step is continued until the melted material drains through the draining means of support 8.

During this step, the melted material, namely the plastic sheathing and insulating material of the rejects or scraps of cables or wires which are processed, is collected by draining though collector 10 towards and into recovery tank 12.

Next, temperature T inside chamber 4 of enclosed space 2 is in a second period of time raised to a higher value Tv, for example of the order of magnitude of 500° C., selected in such a way that the plastic material remaining attached to the parts dissipates in the form of vapour and/or in the form of gas. It is specified here that recovery tank 12 is not subjected to these increases in temperature since it is arranged, in installation 1, under support 8, in thermal contact with the exterior, so that it is not subjected to the rays of heating means 14. Recovery tank 12 thus acts as a cold trap in which the material which has drained is protected from dissipation, then solidified. It is also to be understood that during processing of parts P, recovery tank 12 is maintained at a temperature lower or equal to melting temperature Tf.

When the method has come to an end, that is to say when the organic synthetic material or materials of the parts to be processed have become detached from the metallic material or materials which remain thus stripped on support 8, temperature T inside processing chamber 4 is reduced whilst bringing it to atmospheric pressure or reintroducing into said chamber a sufficient quantity of outside air.

Then, communicating door 6 is opened to recover the material, here the metallic part of the core of the processed cables or wires, situated on support 8, then via the lock chamber of enclosed space 2 which is not shown, access is obtained to recovery tank 12 which is removed. One thus extracts the plastic material which had previously been melted and which has solidified in the form of a recyclable "loaf".

One thus recovers after cooling, on the one hand the plastic material which has drained into recovery tank 12 and, on the other hand, the metallic material or materials which remain on support 8.

It is specified here that the block of solidified plastic material which is recovered via recovery tank 12 must then be recycled by being cut up and put into granular form. This recycled material may thus be mixed with a "new" material for the production of other industrial parts.

It is specified that in a preferred embodiment of this method, the vacuum inside processing chamber 4 of enclosed space 2 is created during the material processing steps, via suction means formed by vacuum pump 22.

Further, during these steps, the parts to be processed are heated by thermal radiation.

It will also be mentioned that in another embodiment, the removal of the oxygen from chamber 4 of enclosed space 2 is achieved by introducing a non-oxidising gas such as nitrogen into said enclosed space.

Furthermore, in this method, one recovers at the outlet of enclosed space 2, the melted material which escapes in the form of gaseous emanations, formed during the increase in temperature of the enclosed space and while the temperature is maintained at least at the melting temperature of one of the materials to be recovered, by circulating these gaseous emanations via conduit 16 through recovery filter 18. As has been explained above, in this step, the material is precipitated initially in the form of gas, via a cooling fluid projected via conduit 20 and sucked by ring water pump 22.

Thus, whereas the material in the form of gas is precipitated downstream of suction means 22, it is brought into sedimentation tank 26 which is itself arranged upstream of said suction means 22. This step is achieved by recirculating the cooling liquid between suction means 22, sedimentation tank 26 and recirculating pump 34.

It is specified finally that the remaining gases are processed at the outlet of suction means 22 by being circulated through gas processing means 32 comprising catalyst 28.

We claim:

1. Method for recovering materials from parts to be processed, such as rejects or scraps of new or used sheathed cables and/or insulated wires, comprising the steps of:
   (a) introducing said parts into an airtight enclosed space and placing them on a support provided with draining means,
   (b) removing oxygen contained in the enclosed space to create a neutral, non-oxidising atmosphere in the latter,
   (c) raising the temperature inside the enclosed space until it reaches a melting temperature of one of the materials forming said parts, and until said material drains through the draining means,
   (d) collecting said melted material in a recovery tank maintained at a temperature less or equal to said melting temperature,
   (e) further raising the temperature inside the enclosed space to cause said material, remaining on the parts to dissipate in the form of vapour or gas, and
   (f) recovering after cooling, on the one hand, the material drained into said tank, and on the other hand, the material or materials remaining on the support, wherein, in step (b) a vacuum is created in said enclosed space. the vacuum being maintained at least during steps (c) to (e) via suction means.

2. Recovery method according to claim 1, wherein said suction means comprise a vacuum pump.

3. Recovery method according to claim 2, wherein said suction means comprise a pump of the ring water type.

4. Recovery method according to claim 3, wherein in steps (c) and (e), the enclosed space is heated by thermal radiation.

5. Recovery method according to claim 2, wherein in steps (c) and (e), the enclosed space is heated by thermal radiation.

6. Recovery method according to claim 1, wherein in step (b) the oxygen is removed by introducing a non-oxidising gas into said enclosed space.

7. Recovery method according to claim 6, wherein the non-oxidising gas is nitrogen.

8. Recovery method according to claim 1, wherein during steps (c) to (e), one recovers, in a step (g), at an outlet of the enclosed space, the melted material escaping in the form of gas which is formed during the increase in the temperature and while said melting temperature is maintained.

9. Recovery method according to claim 8, wherein in step (g) said material in the form of gas is precipitated via a cooling fluid.

10. Recovery method according to claim 1, wherein in steps (c) and (e), the enclosed space is heated by thermal radiation.

11. A method according to claim 1, wherein during steps (c) to (e) one recovers in a step (g) at an outlet of the enclosed space, melted material escaping in the form of gas which is formed during the increase in the temperature and while said melting temperature is maintained is precipitated via a cooling fluid, and in step (g) the material in the form of gas is precipitated downstream of said suction means, the precipitated material being brought into a sedimentation tank arranged upstream of said suction means.

12. Recovery method according to claim 1, wherein in steps (c) and (e), the enclosed space is heated by thermal radiation.

* * * * *